United States Patent [19]

Layre

[11] Patent Number: 5,307,735
[45] Date of Patent: May 3, 1994

[54] BEVERAGE BREWING DEVICE

[75] Inventor: John Layre, Warminister, Pa.

[73] Assignee: Gross-Given Manufacturing Co., St. Paul, Minn.

[21] Appl. No.: 971,807

[22] Filed: Nov. 5, 1992

[51] Int. Cl.$^5$ ............................................. A47J 31/36
[52] U.S. Cl. .................. 99/289 R; 99/302 P
[58] Field of Search .............. 99/289 R, 289 P, 295, 99/279, 302 R, 302 P; 403/247, 253, 256, 257, 350, 348

[56] References Cited

U.S. PATENT DOCUMENTS

| | | | |
|---|---|---|---|
| 3,213,777 | 10/1965 | Heier | 99/289 |
| 3,292,526 | 12/1966 | Heier | 99/289 R |
| 3,496,861 | 2/1970 | Stahler | 99/289 |
| 3,549,690 | 10/1970 | Heier | 99/289 R |
| 3,600,735 | 8/1971 | Jerabek | 403/348 |
| 3,660,117 | 5/1972 | Neely | 99/289 |
| 3,683,790 | 8/1972 | Black et al. | 99/289 R |
| 4,271,753 | 6/1981 | Neely | 99/289 R |
| 4,507,006 | 3/1985 | Golob et al. | 403/348 |
| 4,709,625 | 12/1987 | Layre et al. | 99/389 R |
| 4,893,426 | 1/1990 | Bixler | 403/348 |
| 5,103,716 | 4/1992 | Mikkelsen | 99/289 R |

Primary Examiner—Philip R. Coe
Assistant Examiner—Reginald L. Alexander
Attorney, Agent, or Firm—Panitch Schwarze Jacobs & Nadel

[57] ABSTRACT

A beverage brewing device which includes a supply of heated water. A receptacle for receiving the heated water has a first open end and a second open end. The receptacle is movable between a brewing position for receiving a beverage material through the first open end and a retracted position for discharging the beverage material through the second open end. The first open end of the receptacle is in fluid communication with the supply of heated water when the receptacle is in the brewing position. A base plate is positioned in facing relationship with the second end of the receptacle when the receptacle is in the brewing position. An outlet conduit is releasably secured to the base plate for allowing brewed beverage to flow from the receptacle through the outlet conduit. A filter assembly is fixed with respect to the outlet conduit and is sealingly disposed between the outlet conduit and second end of the receptacle when the receptacle is in the brewing position. Both the filter assembly and the outlet conduit are quickly connectable and disconnectable from the base plate to facilitate cleaning.

5 Claims, 4 Drawing Sheets

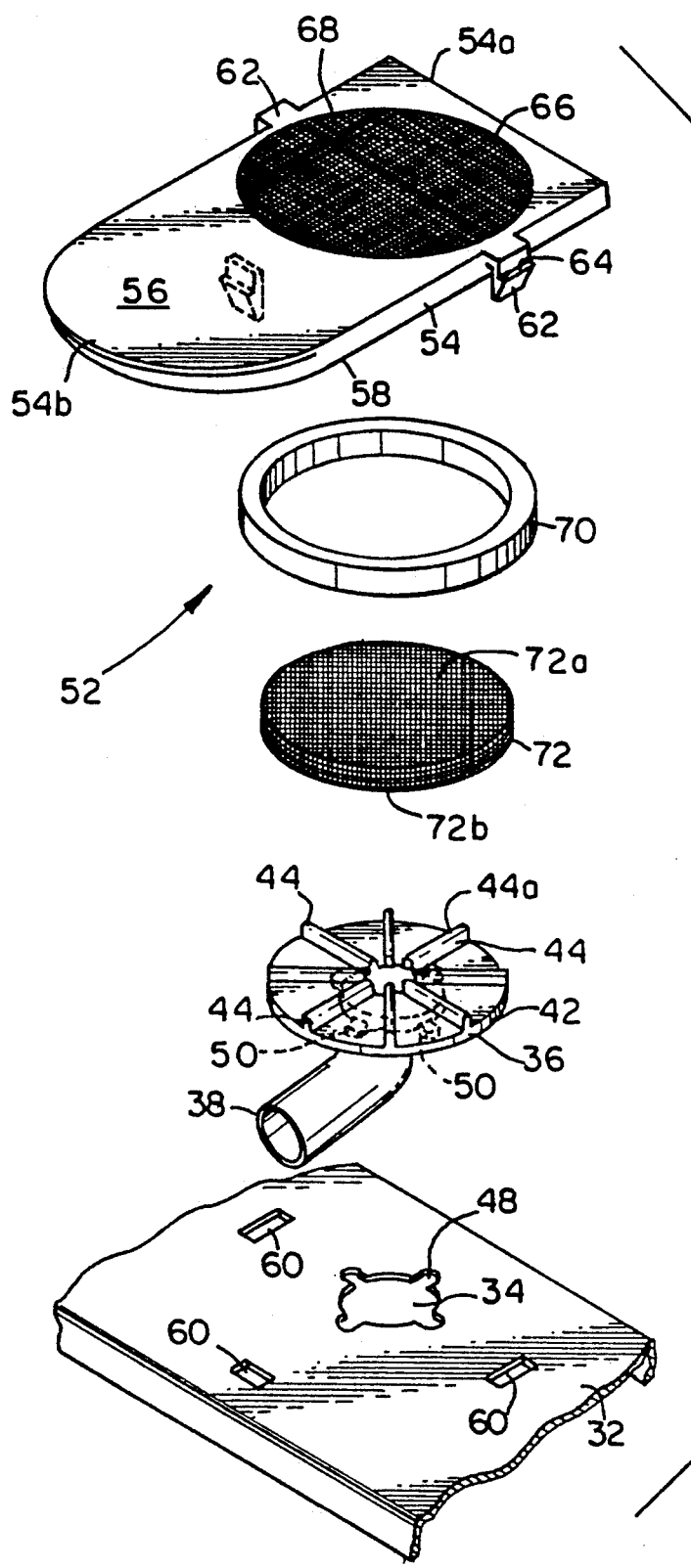

BEVERAGE BREWING DEVICE

FIELD OF THE INVENTION

The present invention relates to a device for brewing beverages and, more particularly, to a device for rapidly preparing cup size quantities of heated beverages.

SUMMARY OF THE INVENTION

It is known to provide coin operated vending equipment for dispensing brewed beverages, such as coffee. The circumstances of use of such vending equipment create many problems which make it difficult to provide satisfactory brewing machines, particularly in the case of coffee machines capable of producing fresh, truly flavored coffee.

This is largely because these machines are located in offices, shops, schools and other buildings where the demand for coffee or other heated beverages may occur at widely spaced intervals. The beverage must be fresh notwithstanding the fact that several hours often elapse between selections of a particular beverage, and the users of the equipment are unwilling to wait for service more than a few moments after they have deposited their paymenet. While the problems of providing a fresh beverage in a relatively short period have been addressed and generally solved by the prior art vending equipment and brewing devices, such devices have been problematic because they are difficult to disassemble and clean during servicing. Thus, maintenance personnel must spend a relatively long time disassembling and cleaning the device in order to maintain quality standards. Cleaning the device at regular intervals is important because the device must remain generally clean to avoid tainting the taste of the beverage being brewed. Hence, their exists a need for a brewing device which is easily disassembled and cleaned to reduce the time necessary to service the device.

Even if the prior art brewing devices are cleaned during servicing periods, they are problematic in that used coffee grounds remain in the brewing station after each brewing cycle. The used coffee grounds also affect the taste of the coffee which is brewed during subsequent cycles. Hence, there exists a need for a brewing device which reduces the number of used coffee grounds which remain in the brewing station after each brewing cycle.

The present invention is a beverage brewing device which is relatively easy to clean during servicing and maintenance and which reduces the number of used coffee grounds which remain in the brewing station after each brewing cycle. In addition, the brewing device of the present invention has less parts and is easier to assemble than the beverage brewing devices of the prior art and, therefore, the present invention results in a savings in the cost for parts as well as in the necessary time to assemble the beverage brewing device.

SUMMARY OF THE INVENTION

Briefly, the present invention is directed to a brewing and dispensing device which includes supply means for dispensing heated water. The supply means has an outlet for allowing the heated water to flow therethrough. A receptacle, having a first open end and a second open end, is movable between a brewing position for receiving a beverage material through the first open end and a retracted position for discharging the beverage material within the receptacle through the second open end. The first open end of the receptacle is in fluid communication with the outlet when the receptacle is in the brewing position. A base plate is positioned in facing relationship with the second end of the receptacle when the receptacle is in the brewing position. The base plate includes an aperture extending therethrough. The aperture is in registry with the second end of the receptacle when the receptacle is in the brewing position. An outlet conduit is releasably secured to the base plate in alignment with the aperture for allowing heated beverage to flow from the receptacle through the outlet conduit. A filter assembly is fixed with respect to the outlet conduit and sealingly disposed between the outlet conduit and the second end of the receptacle when the receptacle is in the brewing position. The filter assembly includes a mounting plate having a first planar surface facing away from the base plate and a second surface. The first planar surface is in facing sealed engagement with the second end of the receptacle when the receptacle is in the brewing position. The mounting plate includes filter means for preventing the beverage material from passing through the second end of the receptacle and for allowing brewed beverage to pass through the second end of the receptacle to the outlet conduit.

BRIEF DESCRIPTION OF THE DRAWINGS

The foregoing summary, as well as the following detailed description of the presently preferred embodiment of the invention will be better understood when read in conjunction with the appended drawings. For the purpose of illustrating the invention, there is shown in the drawings, an embodiment which is presently preferred. It should be understood, however, that the present invention is not limited to the particular arrangement and instrumentality shown. In the drawings:

FIG. 5 is an exploded perspective view of a filter assembly, outlet conduit, and base plate used in connection with the beverage brewing device of FIG. 1.

DETAILED DESCRIPTION OF THE PREFERRED EMBODIMENT

Figure 1:
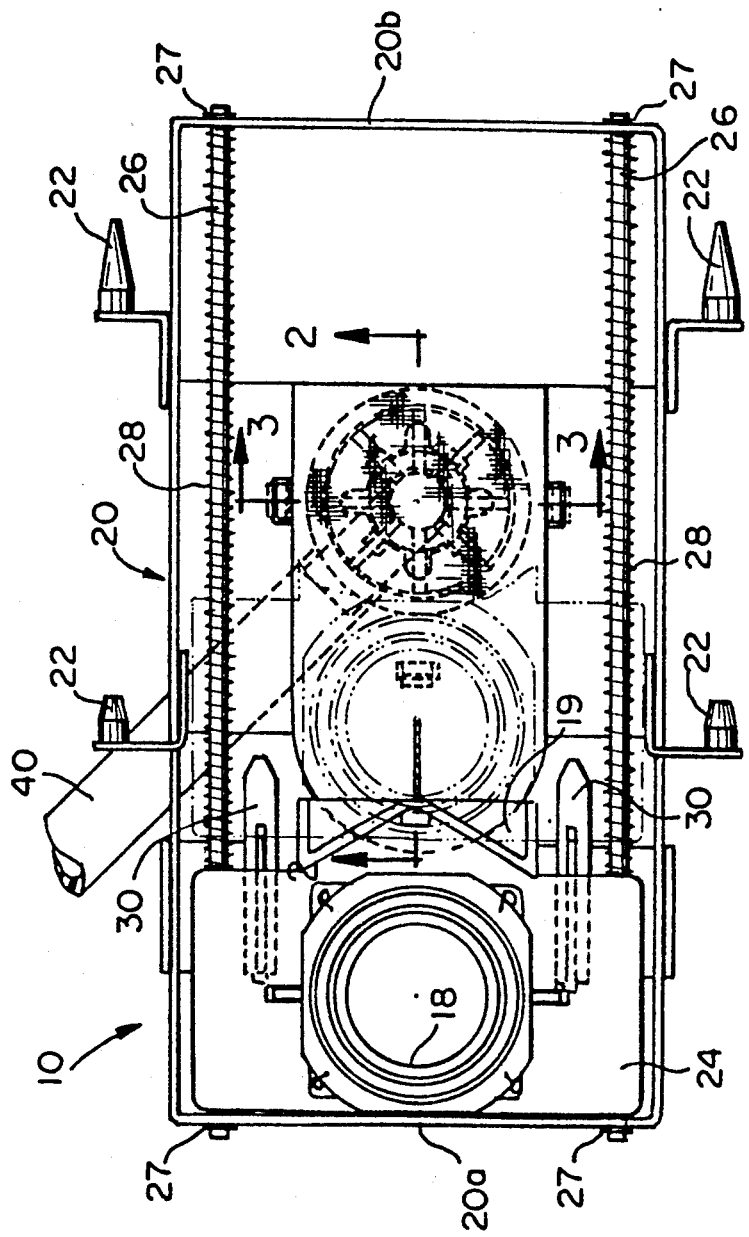
FIG. 1 is a top elevational view of a beverage brewing device in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the beverage brewing device and designated parts thereof. The terminology includes the words above specifically mentioned, derivatives thereof and words of similar import.

Referring now to the drawings in detail, wherein like numerals indicate like elements throughout, there is shown in FIGS. 1–5 a beverage brewing device, generally designated 10, in accordance with the present invention. It is understood by those skilled in the art that the beverage brewing device 10 (hereinafter "brewing device 10") shown in FIGS. 1-5 is only a portion of a vending machine for rapidly preparing cup size quantities of heated beverages. That is, only the portion of the brewing device 10 which is pertinent to the present invention is shown in the drawings. The remaining portions of the vending machine and brewing device 10 are well understood by those skilled in the art. For instance, U.S. Pat. Nos. 3,213,777; 3,292,526 and 3,349,690 disclose the remaining portions of such brewing devices and are hereby entirely incorporated by reference. Accordingly, further description of the elements of the brewing device 10 which are not shown in the drawings is omitted for purposes of convenience only and is not limiting.

Figure 4:
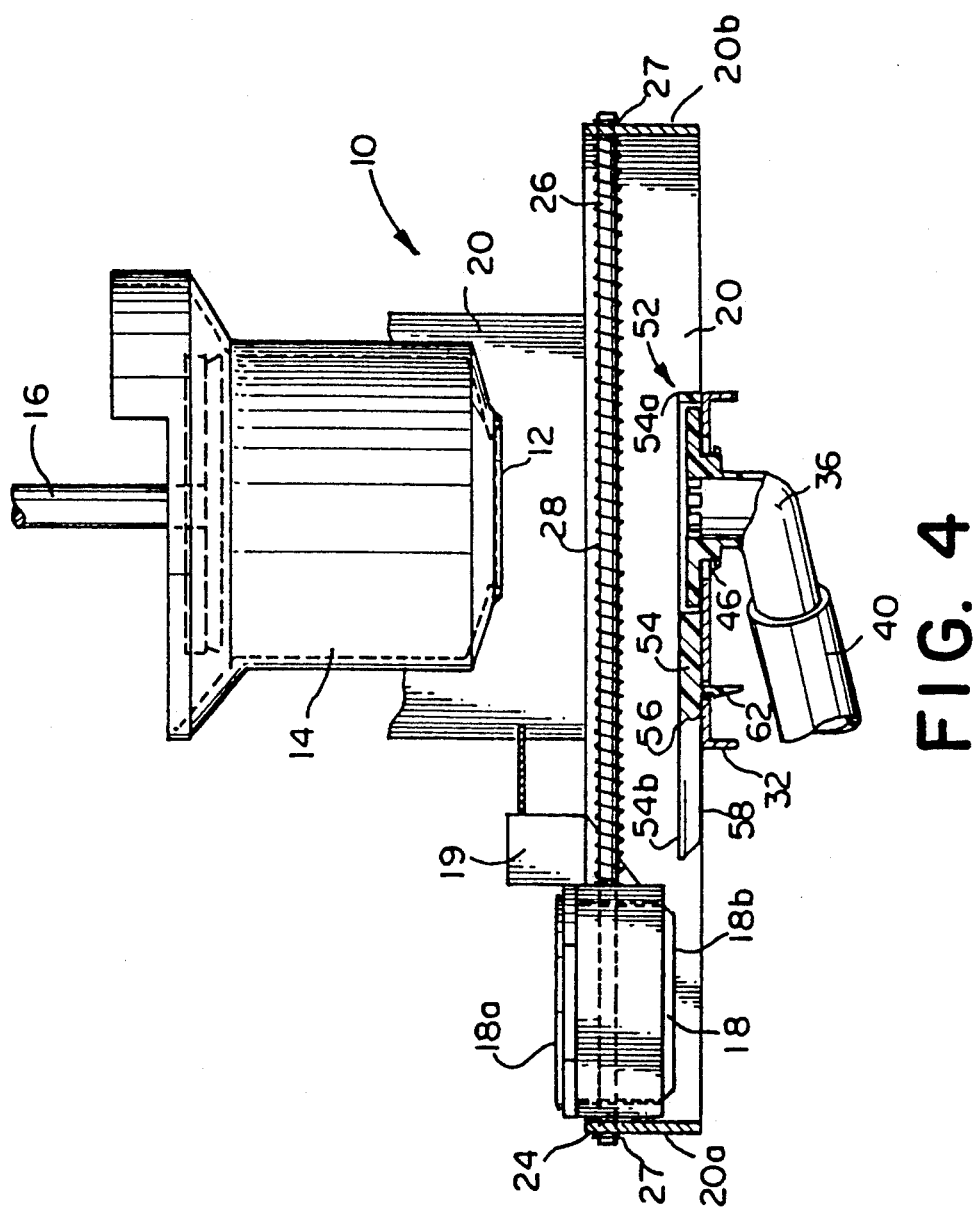
FIG. 4 is a front elevational view, partially in cross-section, of the beverage brewing device shown in FIG. 1.

Referring now to FIGS. 1 and 4, the brewing device 10 includes supply means for dispensing heated water. The supply means has an outlet 12 for allowing the heated water to flow therethrough. In the present embodiment, it is preferred that the supply means be comprised of a reciprocally mounted generally hollow cylinder 14 which is in fluid communication with a supply of heated water (not shown) and an associated piston 16. Generally, heated water is supplied to the hollow interior of the cylinder 14 and the piston 16 is moved downwardly to force the heated water through the outlet 12. The operation and structure of the cylinder 14 and piston 16 are well known to those skilled in the art and are described in the above-mentioned patents. Therefore, further description of the operation and structure of the cylinder 14 and piston 16 is omitted for purposes of convenience only and is not limiting.

Figure 2:
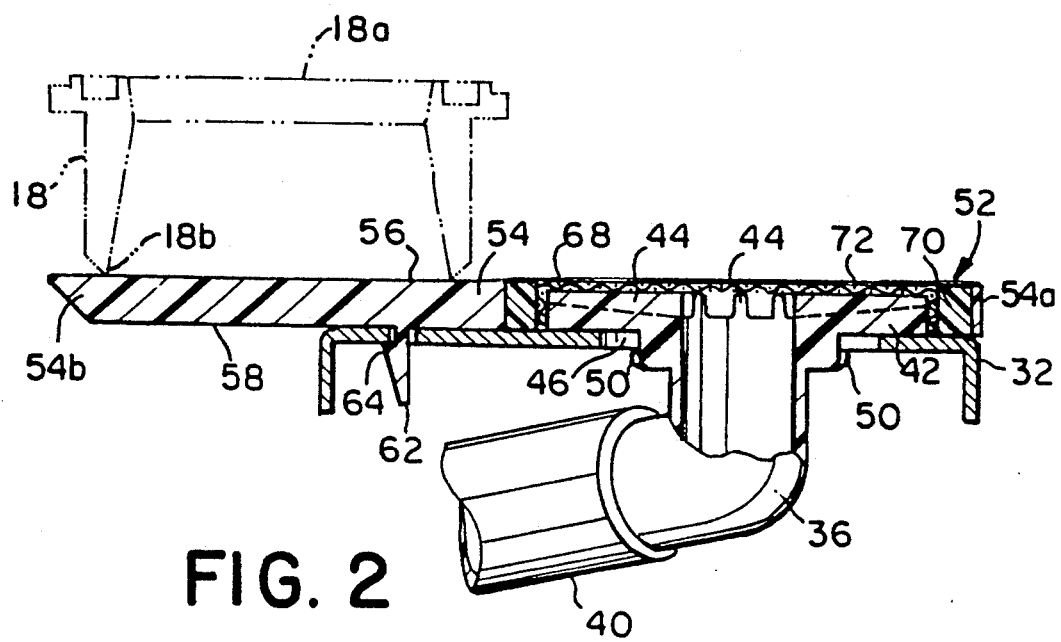
FIG. 2 is a cross-sectional view of the beverage brewing device of FIG. 1 taken along lines 2—2 of FIG. 1.

Referring now to FIGS. 1, 2 and 4, the brewing device 10 includes a receptacle 18 having a first open end 18a and a second open end 18b. The receptacle 18 is movable between a brewing position (now shown) for receiving a beverage material (not shown) through the first open end 18a and a retracted position (shown in FIGS. 1 and 4) for discharging the beverage material within the receptacle 18 through the second open end 18b. The first end 18a of the receptacle 18 is in fluid communication with the outlet 12 of the cylinder 14 when the receptacle 18 is in the brewing position.

Referring now to FIGS. 1 and 4, the receptacle 18 is reciprocally mounted to a frame 20 which is generally rectangular in plan view. The frame 20 is mounted within a vending machine or the like via the mounting elements 22 in a manner well understood by those skilled in the art. The receptacle 18 is housed within a carriage 24. Within the frame 20 are a pair of rods 26 which extend generally parallel with respect to each other on opposed sides of the frame 20. The rods 26 are secured within the frame 20 by clips 27 which are snapped within grooves (not shown) in the portion of the rods 26 positioned outwardly of the frame 20.

The frame 20 includes a first end 20a wherein the receptacle 18 is located in the retracted position and a second end 20b which is proximate the brewing position of the receptacle 18. The carriage 24 includes suitably sized apertures (not shown) for slidably receiving the rods 26 to thereby allow the carriage 24 to move with respect to the rods 26 and frame 20. A coil spring 28 is disposed over each rod 26 between the carriage 24 and the second end 20b of the frame 20 for biasing the carriage 24 and receptacle 18 toward the retracted position or first end 20a of the frame 20.

In the present embodiment, it is preferred that the frame 20 be constructed of a high strength lightweight metallic material, such as stainless steel. However, it is understood by those skilled in the art that other materials, such as aluminum, could be used to construct the frame 20 without departing from the spirit and scope of the invention. The receptacle 18 and carriage 20 are preferably constructed of a polycarbonate, such as "LEXAN". However, it is also understood by those skilled in the art that other high temperature resistant materials could be used to construct the receptacle 18 and carriage 24, without departing from the spirit and scope of the invention. It is preferred that the receptacle 18 and carriage 24 be constructed by a molding process.

Generally, the receptacle 18 and carriage 24 of the present invention are generally identical to the receptacle and carriage described in the above-identified patents. Accordingly, further description of the receptacle 18 and carriage 24 is omitted for purposes of convenience only and is not limiting. However, it is noted that a pair of cams 30 are provided for moving the receptacle 18 with respect to the carriage 20 in a generally vertical direction when the receptacle is in the retracted position to assist in removing the beverage material from within the receptacle 18, as is understood by those skilled in the art. In addition, a V-shaped guide member 19 extends from the carriage 24 toward the second end 20b of the frame 20 for aligning the first open end 18a of the receptacle 18 with the outlet 12 of the cylinder 14 as the cylinder 14 moves downwardly into sealed engagement with the receptacle 18, as is also understood by those skilled in the art.

In the present embodiment, it is preferred that the beverage material be ground coffee beans such that the brewing device 10 brews coffee. However, it is understood by those skilled in the art that the present invention is not limited to any particular type of beverage material and that the brewing device 10 could brew other beverages, such as tea.

Referring now to FIGS. 2-5, the brewing device 10 further includes a base plate 32 positioned in facing relationship with the second end 18b of the receptacle 18 when the receptacle is in the brewing position. The base plate 32 includes an aperture 34 extending therethrough. The aperture 34 is in registry with the second end 18b of the receptacle 18 when the receptacle 18 is in the brewing position. In the present embodiment, the base plate 32 is preferably formed as part of the frame 20 and extends across the entire width of the frame 20.

An outlet conduit or funnel 36 is releasably secured to the base plate 32 in alignment with the aperture 34 for allowing brewed beverage to flow from the receptacle 18 through the outlet conduit 36. The outlet conduit 36 includes an outlet end 38 in the form of an elbow. The outlet end 38 includes a flexible hose 40 thereon for conveying brewed beverage to a dispensing area, as is understood by those skilled in the art. The outlet conduit 36 is preferably constructed of the same material as the carriage 24 and receptacle 18.

Figure 3:
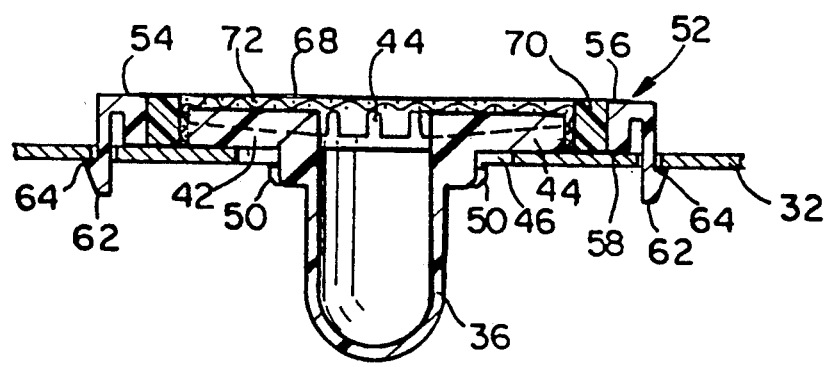
FIG. 3 is a cross-sectional view of the beverage brewing device shown in FIG. 1 taken along lines 3—3 of FIG. 1.

As best shown in FIGS. 2, 3 and 5, the outlet conduit 36 includes an upper flange 42 which extends upwardly and radially outwardly to funnel the brewed beverage through the outlet conduit 36. The flange 42 includes a plurality of upwardly extending ribs 44. Each rib 44 has an upper edge 44a which extends generally parallel to the base plate 32 to provide a generally planar support surface, as described in more detail hereinafter.

Referring now to FIGS. 4 and 5, quick connect means are interconnected between the outlet conduit 36 and the base plate 32 for quickly connecting and disconnecting the outlet conduit 36 and the base plate 32. In the present embodiment, it is preferred that the quick connect means be comprised of one or more interlocking elements, generally designated 46, extending between the base plate 32 and outlet conduit 36. It is preferred that the interlocking elements 46 be comprised of a plurality of notches 48 in the base plate 32 extending radially outwardly from the aperture 34 and a corresponding plurality of fingers 50 extending from the outlet conduit 36. That is, the fingers 50 extend from the outlet conduit 36 such that a gap exists between each finger 50 and the flange 42 which generally corresponds to the thickness of the base plate 32. When the fingers 50 and notches 48 are aligned, the outlet conduit 36 is readily disconnectable from the base plate 32 by lifting the outlet end 38 through the aperture 34. When the outlet conduit 36 is positioned within the aperture 34 and is rotated such that the notches 48 and fingers 50 are unaligned, the outlet conduit 36 is secured to the base plate 32.

While it is preferred that the quick connect means be comprised of cooperating notches 48 in the base plate 32 and fingers 50 on the outlet conduit 36, it is understood by those skilled in the art that other means could be utilized for quickly connecting and disconnecting the outlet conduit 36 and base plate 32. For instance, the outlet conduit 36 could be secured to the base plate 32 at the aperture 34 through a snap fit or other mechanical device which would permit quick connection and disconnection without the necessity of requiring tools.

Referring now to FIGS. 2, 3 and 5, a filter assembly 52 is fixed with respect to the outlet conduit 36 and sealingly disposed between the outlet conduit 36 and the second end 18b of the receptacle 18 when the receptacle 18 is in the brewing position. The filter assembly 52 includes a mounting plate 54 having a first planar surface 56 facing away from the base plate 32 and a second surface 58. The first planar surface 56 is in facing sealed engagement with the second end 18b of the receptacle 18 when the receptacle 18 is in the brewing position. The second surface 58 of the mounting plate 54 is in engagement with the base plate 32.

In the present embodiment, it is preferred that the mounting plate 54 extend between the brewing position and a position intermediate (shown in phantom in FIG. 1) the brewing and retracted positions such that the second end 18b of the receptacle 18 is in facing sealed engagement with the planar surface 56 when the receptacle 18 moves between the intermediate and brewing positions. As best shown in FIGS. 1 and 5, the mounting plate 54 has a first generally square end 54a which is positioned over the outlet conduit 36 and a second generally semicircular end 54b extending outwardly away from the base plate 32 toward the receptacle 18 when the receptacle 18 is in the retracted position. In the present embodiment, it is preferred that the mounting plate 54 be constructed of nylon, such as "TEXLLAN NYLON XP1394". However, it is understood by those skilled in the art that the mounting plate 54 could be constructed of other materials which are capable of withstanding high temperature fluids.

It is preferred that the filter assembly 52 include quick connect means interconnected between the mounting plate 54 and the base plate 32 for quickly connecting and disconnecting the base plate 32 and the filter assembly 52. In the present embodiment, it is preferred that the quick connect means be one or more generally rectangular apertures 60 extending through the base plate 32 and a corresponding number of fingers 62 extending from the second surface 58 of the mounting plate 54. The fingers 62 are aligned with the apertures 60 such that the fingers 62 extend through the apertures 60 when the second surface 58 of the mounting plate 54 is in engagement with the base plate 32. In the present embodiment, it is preferred that the fingers 62 of the mounting plate 54 include a shoulder portion 64 for allowing the mounting plate 54 to be snap fit to the base plate 32, as best shown in FIGS. 2 and 3. However, it is understood by those skilled in the art that other quick connect means could be utilized for quickly connecting and disconnecting the mounting plate 54 and the base plate 32. For instance, the base plate 32 could include a flange which extends upwardly and surrounds the mounting plate 54 to thereby lock the mounting plate 54 to the base plate 32 (not shown).

Referring now to FIGS. 2, 3 and 5, the mounting plate 54 includes filter means for preventing the beverage material from passing through the second end 18b of the receptacle 18 and for allowing brewed beverage to pass through the second end 18b of the receptacle 18 to the outlet conduit 36. In the present embodiment, it is preferred that the filter means be comprised of one or more filters disposed between the second end 18b of the receptacle 18 and the upper edges 44a of the ribs 44 within the mounting plate 54. More particularly, the mounting plate 54 includes an aperture 66 extending therethrough.

A first filter 68 extends across the width of the aperture 66 generally in the same plane as the planar surface 56 of the mounting plate 54. The first filter 68 is preferably of the cloth type. More particularly, it is preferred that the first filter 68 be formed of nylon cloth, having a mesh in the range of 62 to 80 microns. Although other cloth filters could be used without departing from the spirit and scope of the invention.

A sealing ring 70, constructed of a sealing material, such as an elastomer, is sized to generally complement the aperture 66 of the mounting plate 54. The sealing ring 70 is sealingly positioned within the aperture 66.

A second generally cup-shaped filter 72 is positioned within the sealing ring 70 and has a first external surface 72a in facing engagement with the first filter 68 and the sealing ring 70 and a second internal surface 72b in facing engagement with the upper edges 44a of the ribs 44 of the outlet conduit 36. As such, when the mounting plate 54 is secured to the base plate 32, the sealing ring 70 and second filter 72 are sandwiched between the first filter 68 and the outlet conduit 36. In the present embodiment it is preferred that the second filter 72 be formed of a stainless steel screen. However, it is understood by those skilled in the art that the second filter 72 could be constructed of other materials, such as nylon or a polymeric material.

In use, when the brewing device 10 is actuated, the receptacle 18 and carriage 24 are driven from the first end 20a of the frame 20 toward the second end 20b of the frame 20 to the brewing position between the outlet 12 of the cylinder 14 and the outlet conduit 36. The mounting plate 54 and second end 18b of the receptacle 18 are appropriately positioned such that a seal is formed therebetween. The beverage material is then deposited within the receptacle 18 through the first open end 18a. The cylinder 14 is then moved downwardly into sealed engagement with the first open end 18a of the receptacle 18. The V-shaped guide member 19 aligns the carriage 24 such that first open end 18a of the receptacle 18 sealingly receives the outlet 12 of the cylinder 14. Heated water is then deposited within the cylinder 14. The piston 16 is then driven downwardly towards the receptacle 18 to force the water within the cylinder 14 through the receptacle 18 thereby brewing the water therein. That is, the brewed beverage flows through the second end 18b of the receptacle 18, first filter 68, second filter 72 and outlet conduit 36.

After the piston 16 has forced the heated water from the cylinder 14, the piston 16 and cylinder 14 are lifted upwardly and the carriage 24 begins to move toward the retracted position. As the receptacle 18 moves across the mounting plate 54, substantially all of the beverage material within the receptacle 18 stays within the receptacle 18 due to the sealed engagement between the second end 18b of the receptacle 18 and the planar surface 56 of the mounting plate 54. As the receptacle 18 passes the second end 54b of the mounting plate 54, the beverage material is discharged through the second end 18b of the receptacle 18. Cams 30 are provided for shaking the receptacle 18 once receptacle 18 is in the retracted position to remove substantially all of the beverage material within the receptacle 18, as is understood by those skilled in the art. This cycle is repeated each time a brewed beverage is requested.

Since the mounting plate 54 has a planar surface 56, there are no nooks and crannies in which beverage material can be caught or leftover after the brewing cycle. As such, subsequent brewing cycles are not affected by old or used beverage material thereby resulting in fresh brewed beverages between service periods. In addition, since the filter assembly 52 and outlet conduit 36 are easily disconnectable from the base plate 32 when the brewing device 10 is serviced, the filter assembly 52, base plate 32 and outlet conduit 36 can be readily cleaned in a short period of time, thereby reducing the overall time to maintain the brewing device 10.

From the foregoing description, it can be seen that the present invention comprises a beverage brewing device. It will be appreciated by those skilled in the art, that changes could be made to the embodiment described in the foregoing description without departing from the broad inventive concept thereof. It is understood, therefore, that this invention is not limited to the particular embodiment disclosed, but is intended to cover all modifications which are within the scope and spirit of the invention, as defined by the appended claims.

I claim:

1. A beverage brewing device comprising:
supply means for dispensing heated water, said supply means having an outlet for allowing the heated water to flow therethrough;
a receptacle having a first open end and a second open end, said receptacle being movable between a brewing position for receiving a beverage material through the first open end and a retracted position for discharging the beverage material within said receptacle through the second open end, said first open end of said receptacle being in fluid communication with said outlet when said receptacle is in said brewing position;
a base plate positioned in facing relationship with said second end of said receptacle when said receptacle is in said brewing position, said base plate including an aperture extending therethrough, said aperture being in registry with said second end of said receptacle when said receptacle is in said brewing position;
an outlet conduit releasably secured to said base plate in alignment with said aperture for allowing brewed beverage to flow from said receptacle through said outlet conduit;
quick connect means interconnected between said outlet conduit and said base plate for quickly connecting and disconnecting said outlet conduit and said base plate, said quick connect means comprising one or more interlocking elements extending between said base plate and said outlet conduit, said interlocking elements comprise a plurality of notches in said base plate extending radially outwardly from said aperture and a corresponding plurality of fingers extending from said outlet conduit such that when said fingers and notches are aligned said conduit is readily disconnectable from said base plate and when said notches and fingers are unaligned, said outlet conduit is secured to said base plate; and
a filter assembly sealingly disposed between said outlet conduit and said second end of said receptacle when said receptacle is in said brewing position, said filter assembly including filter means for preventing the beverage material from passing through said second end of said receptacle and for allowing said brewed beverage to pass through said second end of said receptacle to said outlet conduit.

2. A beverage brewing device comprising:
supply means for dispensing heated water, said supply means having an outlet for allowing the heated water to flow therethrough;
a receptacle having a first open end and a second open end, said receptacle being movable between a brewing position for receiving a beverage material through the first open end and a retracted position for discharging the beverage material within said receptacle through the second open end, said first open end of said receptacle being in fluid communication with said outlet when said receptacle is in said brewing position;
a base plate positioned in facing relationship with said second end of said receptacle when said receptacle is in said brewing position, said base plate including an aperture extending therethrough, said aperture being in registry with said second end of said receptacle when said receptacle is in said brewing position;
an outlet conduit secured to said base plate in alignment with said aperture for allowing brewed beverage to flow from said receptacle through said outlet conduit; and
a filter assembly fixed with respect to said outlet conduit when said receptacle is in said brewing and discharge positions and sealingly disposed between said outlet conduit and said second end of said receptacle when said receptacle is in said brewing position, said filter assembly including a mounting plate having a first planar surface facing away from said base plate and a second surface, said first planar surface being in facing sealed engagement with said second end of said receptacle when said receptacle is in said brewing position, said mounting plate extending between said brewing position and a position intermediate said brewing and retracted positions such that said second end of said receptacle is in facing sealed engagement with said planar surface when said receptacle moves between said intermediate and brewing positions, said mounting plate including filter means for preventing the beverage material from passing through the second end of said receptacle and for allowing said brewed beverage to pass through said second end of said receptacle to said outlet conduit.

3. A brewing device as recited in claim 2 further including quick connect means interconnected between said mounting plate and said base plate for quickly connecting and disconnecting said base plate and said filter assembly.

4. A beverage brewing device comprising:

supply means for dispensing heated water, said supply means having an outlet for allowing the heated water to flow therethrough;

a receptacle having a first open end and a second open end, said receptacle being movable between a brewing position for receiving a beverage material through the first open end and a retracted position for discharging the beverage material within said receptacle through the second open end, said first open end of said receptacle being in fluid communication with said outlet when said receptacle is in said brewing position;

a base plate positioned in facing relationship with said second end of said receptacle when said receptacle is in said brewing position, said base plate including an aperture extending therethrough, said aperture being in registry with said second end of said receptacle when said receptacle is in said brewing position;

an outlet conduit secured to said base plate in alignment with said aperture for allowing brewed beverage to flow from said receptacle through said outlet conduit;

one or more interlocking elements extending between said base plate and said outlet conduit for quickly connecting and disconnecting said outlet conduit and said base plate; and a filter assembly fixed with respect to said outlet conduit when said receptacle is in said brewing and discharge positions and sealingly disposed between said outlet conduit and said second end of said receptacle when said receptacle is in said brewing position, said filter assembly including a mounting plate having a first planar surface facing away from said base plate and a second surface, said first planar surface being in facing sealed engagement with said second end of said receptacle when said receptacle is in said brewing position, said mounting plate including filter means for preventing the beverage material from passing through the second end of said receptacle and for allowing said brewed beverage to pass through said second end of said receptacle to said outlet conduit.

5. A brewing device as recited in claim 4 wherein said interlocking elements comprise a plurality notches in said base plate extending radially outwardly from said aperture and a corresponding plurality of fingers extending from said outlet conduit such that when said fingers and notches are aligned said conduit is readily disconnectable from said base plate and when said notches and fingers are unaligned, said outlet conduit is secured to said base plate.

* * * * *